(12) United States Patent
Brifault et al.

(10) Patent No.: US 12,737,511 B2
(45) Date of Patent: Sep. 15, 2026

(54) MATERIAL EXTRUSION DETECTION METHOD

(71) Applicant: DASSAULT SYSTEMES, Velizy Villacoublay (FR)

(72) Inventors: Lucas Brifault, Vélizy-Villacoublay (FR); Ariane Jourdan, Vélizy-Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 1151 days.

(21) Appl. No.: 17/664,453

(22) Filed: May 23, 2022

(65) Prior Publication Data

US 2022/0382931 A1 Dec. 1, 2022

(30) Foreign Application Priority Data

May 21, 2021 (EP) .................................... 21305673

(51) Int. Cl.
*G06F 30/17* (2020.01)
*G06F 111/08* (2020.01)

(52) U.S. Cl.
CPC .......... *G06F 30/17* (2020.01); *G06F 2111/08* (2020.01)

(58) Field of Classification Search
CPC ............................ G06F 30/17; G06F 2111/08
See application file for complete search history.

(56) References Cited

U.S. PATENT DOCUMENTS

| | | | |
|---|---|---|---|
| 7,050,951 | B1 | 5/2006 | Tautges et al. |
| 7,492,364 | B2 | 2/2009 | Devarajan et al. |
| 10,956,625 | B2 | 3/2021 | Makem et al. |
| 2008/0040080 | A1 | 2/2008 | Bae et al. |

(Continued)

FOREIGN PATENT DOCUMENTS

| | | |
|---|---|---|
| CN | 111383341 A | 7/2020 |
| JP | 2005-149245 A | 6/2005 |

(Continued)

OTHER PUBLICATIONS

Recep M. Gorguluarslan, NPL, "A Multilevel Upscaling Method for Material Characterization of Additively Manufactured Part Under Uncertainties", Published Oct. 12, 2015 (Year: 2015).*

(Continued)

*Primary Examiner* — Rehana Perveen
*Assistant Examiner* — Angel Calle
(74) *Attorney, Agent, or Firm* — Oblon, McClelland, Maier & Neustadt, L.L.P.

(57) ABSTRACT

A computer-implemented method for material extrusion detection in a portion of a mechanical part having a distribution of material. The method includes obtaining a CAD 3D model of the mechanical part including a skin portion representing an outer surface of the portion of the mechanical part and an extrusion axis. The method further includes computing a ratio of an area of an orthogonal projection of the skin portion over an area of the skin portion. The method further includes determining whether or not the distribution of material is arranged as an extrusion based on the ratio and a ratio threshold. The outer surface is determined to be an extrusion surface when the ratio is lower than the ratio threshold. This forms an improved solution for processing a CAD 3D model of a mechanical part.

20 Claims, 5 Drawing Sheets

(56) References Cited

U.S. PATENT DOCUMENTS

| | | | |
|---|---|---|---|
| 2013/0018634 | A1 | 1/2013 | Bae et al. |
| 2015/0151286 | A1 | 6/2015 | Rivas-Cardona et al. |
| 2018/0059631 | A1 | 3/2018 | Newell |
| 2018/0285500 | A1 | 10/2018 | Wilcox et al. |
| 2020/0043186 | A1 | 2/2020 | Selviah et al. |
| 2020/0151286 | A1 | 5/2020 | Willis et al. |
| 2020/0211279 | A1 | 7/2020 | Randon et al. |

FOREIGN PATENT DOCUMENTS

| | | | |
|---|---|---|---|
| JP | 2010-282538 | A | 12/2010 |
| JP | 2016-45781 | A | 4/2016 |
| JP | 2016-118502 | A | 6/2016 |
| JP | 2020-115338 | A | 7/2020 |
| JP | 2020-115339 | A | 7/2020 |
| WO | WO 2008/100248 | A2 | 8/2008 |
| WO | WO 2008/100248 | A3 | 8/2008 |
| WO | WO 2019/087032 | A1 | 5/2019 |

OTHER PUBLICATIONS

Bill Lozanovski, NPL, "A Monte Carlo simulation-based approach to realistic modelling of additively manufactured lattice structures", Published Jan. 28, 2020 (Year: 2020).*

Nick Tepylo, NPL, "Laser-Based Additive Manufacturing Technology for Aerospace Application", Aug. 22, 2019 (Year: 2019).*

Xin Liu, NPL, "Numerical modeling and simulation of selective laser sintering in polymer powder bed", Nov. 13, 2018 (Year: 2018).*

Office Action dated Feb. 17, 2026, issued in counterpart JP Application No. 2022-134158, (with English Translation). (6 pages).

Benko, Pal et al., "Algorithms for reverse engineering boundary representation models", Computer Aided Design [online], 2001, vol. 33, pp. 839-851, <https://people.eecs.berkeley.edu/sequin/CS284/PAPERS/Benko_RevEng-Brep.pdf>.

European Office Action issued Dec. 8, 2025 in European Patent Application No. 21306184.9, 7 pages.

Boussuge et al., "Idealized Models for FEA Derived from Generative Modeling Processes Based on Extrusion Primitives", Engineering with Computers, Jan. 22, 2015, XP055887737, 17 pages.

Office Action dated Feb. 10, 2026, issued in counterpart JP Application No. 2022-081416. (5 pages).

P.A. Fayolle et al. . "3D shape reconstruction of template models using genetic algorithms", Proceedings of the 17th International Conference on Pattern Recognition, 2004. ICPR 2004, 2004 • pp. 269-272, vol. 2. (4 pages).

Abe, Osamu et al., "Prototype of 3D sketch input front-end processor BlueGrottoFEP", 2005, with machine translation. (5 pages).

Kazhdan, Michael et al. • "Screened poisson surface reconstruction"• ACM Transactions on Graphics • Jun. 2013 • vol. 32 • No. 3 • pp. 1-13. (13 pages).

Tarini, Marco et al., "Simple quad domains for field aligned mesh parametrization", ACM Transactions on Graphics, Dec. 2011 • vol. 30 • No. 6. (11 pages).

Yu, Yizhou et al., "Mesh editing with poisson-based gradient field manipulation", ACM Transactions on Graphics, Aug. 2004 • vol. 23 • No. 3. (8 pages).

Extended European Search Report issued Nov. 12, 2021 in European Patent Application No. 21305671.6 filed May 21, 2021, 12 pages.

Extended European Search Report issued Nov. 12, 2021 in European Patent Application No. 21305673.2 filed May 21, 2021, 11 pages.

Lévy, B., et al., "Least Squares Conformal Maps for Automatic Texture Atlas Generation", ACM Transactions on Graphics, Association for Computing Machinery, 2002, vol. 21, No. 3, pp. 362-371.

Mullen, P., et al., "Spectral Conformal Parameterization", Computer Graphics Forum, Wiley, 2008, Eurographics Symposium on Geometry Processing, vol. 27, No. 5, 1 total page.

Knoppel, F., et al., "lobally optimal direction fields", ACM Trans. Graph., vol. 32, No. 4, 2013, 1 total page.

Cohen-Steiner, D., et al., "Restricted delaunay triangulations and normal cycle", In ACM Symp. on Computational Geometry, 2003, 1 total page.

Wang, J., et al., "A framework for 3d model reconstruction in reverse engineering", Computers & Industrial Engineering, vol. 63, No. 4, 2012, pp. 1189-1200.

Schnabel, R., et al., "Efficient RANSAC for point-cloud shape detection", Computer Graphics Forum, vol. 26, No. 2, 2007, 12 total pages.

Chuang, J., et al., "A potential-based generalized cylinder representation", Computers and Graphics, Elsevier, GB, vol. 28, No. 6, 2004, pp. 907-918.

Office Action dated Nov. 19, 2025, issued in counterpart U.S. Appl. No. 17/805,406. (22 pages).

Japanese Office Action issued Jan. 27, 2026, in corresponding Japanese Patent Application No. 2022-081420 (with English Translation), 6 pages.

Tennety, Chandu, "Machining Feature Recognition Using 2D Data of Extruded Operations in Solid Models". Master's thesis, Ohio University, 2007. (120 pages).

Xing, Qing, "Graph Rotation Systems for Physical Construction of Large Structures", Doctorate thesis, Texas A&M University, (2012) . (Year: 2011) (129 pages).

Buonamici, Francesco, Monica Carfagni, Rocco Furferi, Lapa Govemi, Alessandro Lapini, and Yary Volpe. "Reverse engineering modeling methods and tools: a survey." Computer-Aided Design and Applications 15, No. 3 (2018): 443-464. (Year: 2017) (22 pages).

Pobozniak, Janusz. "Algorithm for ISO 14649 (STEP-NC) feature recognition." Management and Production Engineering Review 4 (2013). (Year: 2013) (9 pages).

Final Office Action dated Apr. 2, 2026, issued in counterpart U.S. Appl. No. 17/900,638. (34 pages).

* cited by examiner

MATERIAL EXTRUSION DETECTION METHOD

CROSS-REFERENCE TO RELATED APPLICATIONS

This application claims priority under 35 U.S.C. § 119 or 365 to European Application No. 21305673.2, filed May 21, 2021. The entire contents of the above application are incorporated herein by reference.

TECHNICAL FIELD

The disclosure relates to the field of computer programs and systems, and more specifically to a method, system, and program for material extrusion detection in a portion of a mechanical part.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some of these systems and programs provide functionalities for processing CAD 3D models of mechanical parts in order to (e.g., automatically) detect features of the mechanical parts.

Schnabel et al., "*Efficient RANSAC for Point-Cloud Shape Detection*", Computer Graphics Forum, 26 (2), 2007, pp. 214-226, presents an automatic Random Sample Consensus (RANSAC) algorithm to detect basic shapes in unorganized point clouds. The algorithm decomposes the point cloud into a concise, hybrid structure of inherent shapes and a set of remaining points. Each detected shape serves as a proxy for a set of corresponding points. The algorithm is based on random sampling and detects planes, spheres, cylinders, cones, and tori.

Wang et al., "*A Framework for 3D Model Reconstruction in Reverse Engineering*", Computers & Industrial Engineering, 63 (4), 2012, pp. 1189-1200, presents a framework for 3D model reconstruction. The framework, composed of four main components, provides a systematic solution to reconstruct geometric model from the surface mesh of an existing object. First, the input mesh is pre-processed to filter-out noise. Second, the mesh is partitioned into segments to obtain individual geometric feature patches. Then, two integrated solutions, namely solid feature-based strategy and surface feature-based strategy, are exploited to reconstruct primitive features from the segmented feature patches. Finally, the modeling operations, such as solid Boolean and surface trimming operations, are performed to assemble the primitive features into the final model.

Within this context, there is still a need for improved solutions for processing a CAD 3D model of a mechanical part.

SUMMARY

It is therefore provided a computer-implemented method for material extrusion detection in a portion of a mechanical part having a distribution of material. The method comprises providing a computer-aided design 3D model of the mechanical part, the 3D model including a skin portion representing an outer surface of the portion of the mechanical part, and an extrusion axis. The method further comprises computing a ratio of an area of an orthogonal projection of the skin portion on a plane orthogonal to the extrusion axis, over an area of the skin portion. The method further comprises determining whether or not the distribution of material is arranged as an extrusion, by determining whether or not the outer surface is an extrusion surface based on the ratio and a ratio threshold. The outer surface is determined to be an extrusion surface when the ratio is lower than the ratio threshold, and the outer surface is determined not to be an extrusion surface otherwise.

The method may comprise one or more of the following:

- the computing includes performing a Monte-Carlo method;
- the Monte-Carlo method includes:
  - providing a bounded domain;
  - sampling points of the bounded domain according to a probability distribution;
  - for each sampled point, determining whether or not a respective line passing through the sample point and parallel to the extrusion axis, intersects the skin portion;
- the area of the orthogonal projection of the skin portion being proxied by a product between:
  - an estimation of an expectation of lines intersecting the skin portion, and
  - an area of the bounded domain;
- the estimation of the expectation of lines intersecting the skin portion equals an average of the values of an intersection function representing the intersection of a line with the skin portion, at each sampled point:
- the method includes computing the orthogonal projection of the skin portion; the bounded domain lies on the plane orthogonal to the extrusion axis and encompasses the orthogonal projection of the skin portion; and for each sampled point, the determining includes determining whether or not the sampled point is inside the projection of the skin portion on the bounded domain;
- the probability distribution has a strictly positive density of probability;
- the intersection function is an indicator function divided by the density of probability, the indicator function indicating for a position on the bounded domain whether or not said position belongs to the orthogonal projection of the skin portion;

the providing of the extrusion axis comprises determining the extrusion axis by optimizing an objective function penalizing non-orthogonality of a normal of the skin portion to a candidate extrusion axis based on a criterion that the objective function value must be lower than an objective-function-value threshold;

the 3D model is a 3D mesh, the 3D mesh having discrete elements, wherein the ratio threshold is optionally inversely proportional to the number of discrete elements of the 3D mesh; and/or computing an extrusion profile based on the extrusion axis.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
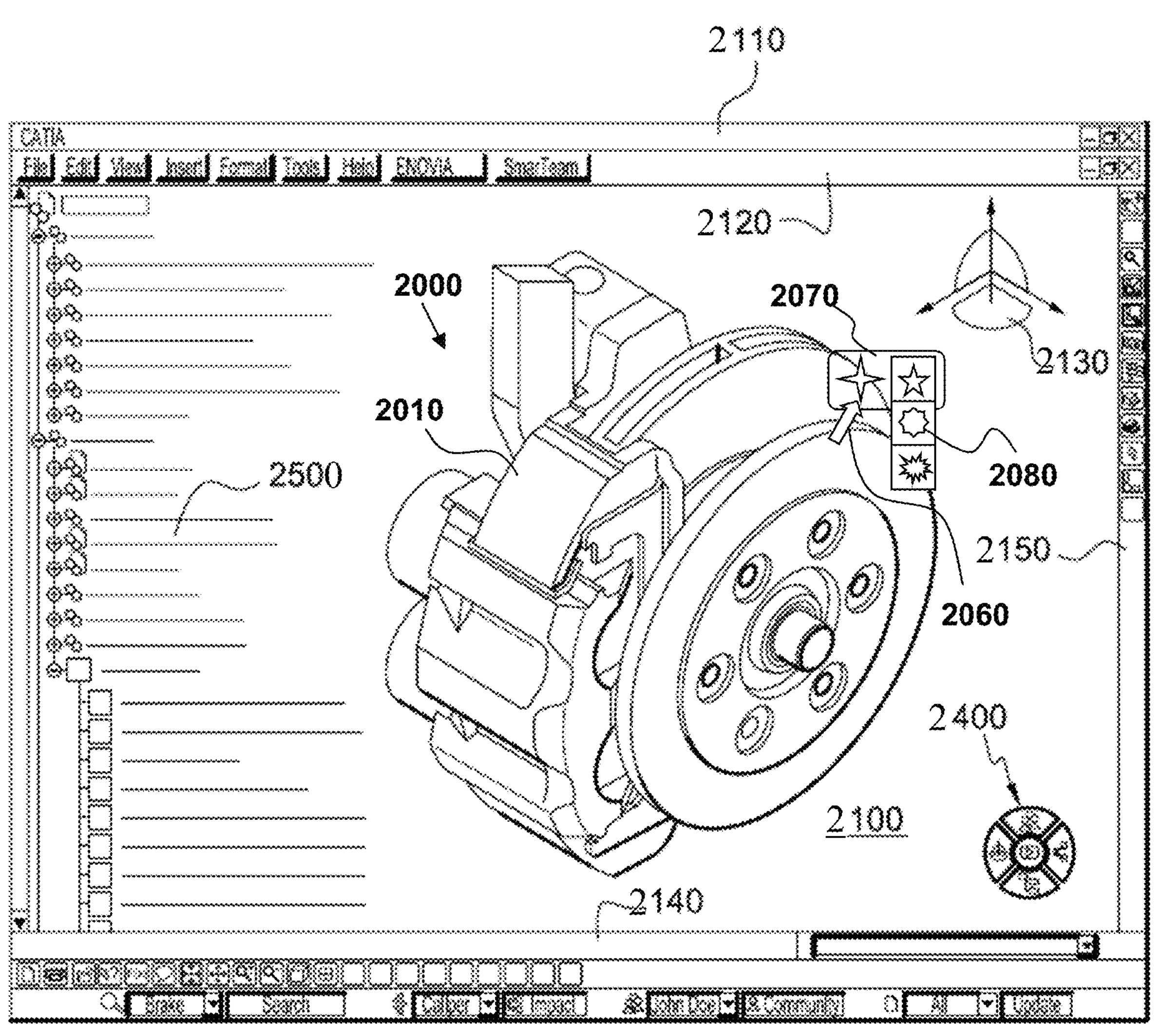
FIG. 1 shows an example of a graphical user interface of the system.

It is hereby described a computer-implemented method for material extrusion detection in a portion of a mechanical part, the portion of the mechanical part having a distribution of material. The method comprises providing a computer-aided design (CAD) 3D model of the mechanical part. The 3D model includes a skin portion. The skin portion represents an outer surface of the portion of the mechanical part. The method further comprises providing an extrusion axis. The method further comprises computing a ratio of an area of an orthogonal projection of the skin portion on a plane orthogonal to the extrusion axis, over an area of the skin portion. The method further comprises determining whether or not the distribution of material is arranged as an extrusion, by determining whether or not the outer surface is an extrusion surface based on the ratio and a ratio threshold. The outer surface is determined to be an extrusion surface when the ratio is lower than the ratio threshold, and the outer surface is determined not to be an extrusion surface otherwise.

This constitutes an improved solution for processing a CAD 3D model of a mechanical part, for example, in order to detect features of the mechanical parts. Indeed, the method provides an extrusion detection test in a portion of a mechanical part by analyzing a respective 3D model of the mechanical part. The method enables the detection of an extrusion, i.e., by detecting whether or not the material distribution of said portion is such that an outer surface thereof is an extrusion surface. In particular, the method enables verifying the presence of an extrusion with respect to a given extrusion axis.

Detection of extrusions is particularly relevant in the field of manufacturing CAD, that is, for software solutions to assist design processes and manufacturing processes, whereby the objective is to produce a physical product corresponding to a designed CAD 3D model. Within this context, the CAD 3D model represents a manufacturing product, that may be manufactured downstream to its design. The method may thus be part of such a design and/or manufacturing process. The method may for example form or be part of a step of CAD feature obtention within such design and/or manufacturing process, the step of CAD feature obtention including detection of geometries and parameterization of the detected geometries with respective CAD features. For example, the step of CAD feature obtention may be a step of feature-tree construction. Within this step, the method detects extrusion surfaces, e.g., while other methods may detect other geometries. The method may then further comprise parameterizing the detected extrusion surface(s). Indeed, detecting a respective extrusion surface as does the method allows parametrization of the respective skin portion of the CAD 3D model representing said extrusion surface. The parameterization facilitates the manipulation/edition of the CAD model. The step of CAD feature obtention which includes the method may be followed by further design and/or manufacturing steps which use parameterized and detected geometries/CAD features, and notably the extrusion surface(s) detected by the method. These further steps may include further design and/or editions actions, tests, simulations and/or manufacturing. The method may in other words be included in a manufacturing CAD process, at a step where the CAD model is adapted for use in subsequent steps of the manufacturing CAD process (e.g., further design/edit actions, tests, simulations and/or manufacturing). The method may be included in many other applications which use the extrusion surfaces detected by the method.

The method thus improves the processing (e.g., edition) of an extrusion surface in a CAD 3D model, which for example allows to prepare it in view of the manufacturing. In other words, the detection, and optional instantiation, of extrusion surfaces that the method provides, may be used for manufacturing purposes. Some manufacturing processes are indeed designed to specifically construct objects composed mainly of extrusion surfaces, for example an extrusion process. For example, the extrusion surfaces detected by the method may be edited in view of features of a downstream manufacturing process (e.g., molding, machining). This facilitates preparation and/or set up of the manufacturing machine(s) (e.g., a mold, or a machining tool). Thus, the method improves the manufacturing of a product represented by the CAD model and increases productivity of the manufacturing process.

As previously discussed, the detection of extrusion surfaces enables parameterization of the detected extrusion surfaces. The method may thereby be used to parameterize the CAD model or at least a part thereof, to obtain a parameterized CAD model or part thereof. By "parameterized", it is meant that the CAD model (or at least a part of the CAD model, e.g., the skin portion) may be fitted with exactly one 3D geometrical object represented by a parametric equation or a parametric function, thus involving one or more parameters. The one or more parameters may take values each in a respective continuous range. A 3D parameterized geometrical object allows an easy manipulation and/or editability and/or efficient storage in memory, as opposed to non-parameterized 3D geometrical objects such as discrete representations (e.g., point clouds, meshes, or voxel representations). For example, the extrusion surfaces may be fitted with canonical primitives (e.g., parallelepipeds or cylinders) or parameterized with other adapted geometrical tools, e.g., with non-canonical parameterized surfaces such as NURBS. In any application of the method, including those discussed hereinafter, the CAD 3D model may be a measured CAD 3D model (i.e., a CAD model obtained from physical measurements on the mechanical part as discussed hereinbelow). In such a case, performing an extrusion detection on the CAD 3D model allows to process the (raw) measured CAD 3D model and allows to ultimately edit the measured CAD 3D model (i.e., once an extrusion surface detected). The method may thereby generally be used to detect an extrusion surface on a measured portion of the mechanical part and then process it into an editable data structure.

An extrusion surface is a surface which is coherent from the point of view of the manufacturing. In other words, the corresponding portion of the mechanical part, in the real-world, has a respective geometry requiring or adapted to a respective manufacturing process (e.g., molding, additive manufacturing or machining), for example corresponding to a preferred (e.g., with respect to manufacturing constraints) machining path or preferred (e.g., with respect to manufacturing constraints) characteristics of a mold.

In examples, the mechanical part may be a molded part, and the portion may be manufactured by molding. The parameterization of the detected extrusion surface representing the portion, said parameterization being enabled by the method as previously discussed, allows in such case the application of a draft operator to the parameterized extrusion surface. As known per se from manufacturing CAD, draft operators are applicable to extrusion features, and the application of a draft operator allows to confer to the extrusion surface a conical shape by defining a draft angle with respect to the extrusion axis. During the molding process of the corresponding portion, which inherits this conical shape obtained during the design, the conical shape eases the withdrawal of the portion from the mold (i.e., the demolding/unmolding). In other words, extrusion surfaces may be efficiently drafted (a slight angle applied to vertical surfaces) in order to facilitate their unmolding along their extrusion axis. The method may thereby be included in a manufacturing CAD process of design and/or manufacturing of a molded part, comprising edition steps downstream to the extrusion detection performed by the method. The edition steps may include the application of a draft operator to the extrusion surface detected by the method to meet constraints of the corresponding mold of the downstream molding process, thereby easing the unmolding/demolding/withdrawal of the molded portion.

In examples, the mechanical part and the portion thereof may be manufactured by additive manufacturing. The parameterization of the detected extrusion surface representing the portion, said parameterization being enabled by the method as previously discussed, allows in such case the definition of a 3D printing path along the extrusion axis of the extrusion surface detected by the method. In examples, the extrusion axis may be an optimal 3D printing path or 3D printing orientation. The method may thereby be included in a manufacturing CAD process of design and/or manufacturing of a mechanical part manufactured by additive manufacturing. The process may include a step of defining a printing path along the extrusion axis of the extrusion surface detected by the method, based on the parameterization of the surface. The process may further include defining a set of up of a 3D printer carrying out the additive manufacturing in accordance with the defined printing path (e.g., extrusion process).

In examples, the mechanical part may be a machined part, and the portion may be manufactured by machining (e.g., cutting). The parameterization of the detected extrusion surface representing the portion, said parameterization being enabled by the method as previously discussed, allows in such case the definition of a path of the machining tool (e.g., cutting tool) along the extrusion axis of the extrusion surface detected by the method. The method may thereby be included in a manufacturing CAD process of design and/or manufacturing of a mechanical part manufactured by machining. The process may include a step of defining a path of a machining tool along the extrusion axis of the extrusion surface detected by the method, based on the parameterization of the surface. The definition of the path may include the identification of portions of the extrusion-shaped portion of the mechanical part to be cut, for example sharp portions to be smoothed with the machined tool. The process may further include defining a set of up of the machining tool carrying out the machining in accordance with the defined path. Use of the extrusion surface(s) detected by the method in manufacturing CAD has been discussed. Other applications, which may be in the manufacturing CAD context or in other contexts, of these detected extrusion surfaces are now discussed.

In a first application, an extrusion surface detected by the method may be used for B-rep construction. B-rep construction is discussed in references P. Benko et al., "*Algorithm for reverse engineering boundary representation models*", Computer-Aided Design, 33, 2001, pp. 839-851, in A. Tumanin, "*Polygonal Mesh to B-Rep Solid Conversion: Algorithm Details and C++ Code Samples*", posted on Sep. 4, 2019 on the Habr.com website, and in Bénière et al., "*Recovering Primitives in 3D CAD meshes*", Proceedings of SPIE, 2011, which are all incorporated herein by reference. As known per se B-rep is a collection of connected bounded surface elements (for example under the STEP file format, as widely known). The B-rep construction may comprise fitting surfaces onto the extrusion surface(s) detected by the method, and bound the surfaces (i.e., determine the B-Rep's topological data, that is, the "is bounded by" relationships) using data about the extrusion (e.g., an extrusion axis and/or an extrusion profile). According to this first application, the extrusion detection method may be included in a computer-implemented process for converting a CAD 3D model representing a mechanical part into a boundary representation. In a second application, an extrusion surface detected by the method may be used for feature-tree construction. This second application comprises using the detected extrusions to construct a feature-tree representation of the CAD 3D model. The feature-tree construction may indeed comprise parameterizing each detected extrusion as a respective CAD extrusion feature, and then add each parameterized CAD extrusion feature to the feature-tree. The extrusion detection method may thus be included in a computer-implemented process for constructing a feature-tree from a CAD 3D model representing a mechanical part. The feature-tree construction process may comprise:

- one or more applications of the method, each application yielding a respective detected extrusion surface, and optionally, application of one or more other geometry detection methods, each application yielded a respective detected other geometry;
- parameterizing each extrusion surface detected by the method as a CAD extrusion feature, and optionally, parameterizing each respective detected other geometry as a corresponding CAD feature;
- including each parameterized CAD feature into the feature-tree of the mechanical part.

In a third application, an extrusion surface detected by the method is used for re-meshing (e.g., if the provided CAD 3D model is a 3D mesh) or re-sampling (e.g., if the provided CAD 3D model is a 3D point cloud). According to the third application, the skin portion may be parameterized as explained above, and this allows the re-meshing or re-sampling of the CAD 3D model. This re-meshing/re-sampling may be used to denoise (e.g., removing outlier points, notably for a 3D point cloud, or smoothing the outer surface of the CAD model, notably for a 3D mesh) the CAD 3D model. Additionally or alternatively, it may be used to tessellate efficiently 3D meshes, i.e., to adapt the size of the mesh's faces to the curvature of the corresponding surfaces in order to minimize the number of faces thereby optimizing the mesh's weight (i.e., storage-wise) while ensuring an optimal discretization distance to the exact surfaces. For example, the re-meshing/re-sampling is used to minimize the mesh's weight while ensuring a sufficiently small distance to the exact surface (e.g., in which case the closeness to the surface is seen as a constraint and not something to optimize). The extrusion detection method may thus be included in a computer-implemented process for re-meshing (resp. re-sampling) a CAD 3D model that is a 3D mesh (resp. a 3D point cloud) representing a mechanical part.

An extrusion surface such as the surface detected by the extrusion detection method may be used in other applications, for example 3D deformation, 3D rendering (geometric/material attributes computation, occlusion culling, shadows determination), 3D animation and/or shape compression. These applications are discussed in reference Kaiser A. et al., "*A survey of Simple Geometric Primitives Detection Methods for Captured 3D data*", Computer Graphics Forum, 2018, which is incorporated herein by reference.

Further, not only does the method detect extrusion, which may be of use in many applications as previously discussed, but the method forms an improved solution for detection of an extrusion surface. Indeed, the method computes a ratio of an area of an orthogonal projection of the skin portion on a plane orthogonal to the extrusion axis, over an area of said skin portion. The computed ratio provides a relative size of the area of the projected skin portion with respect to the area of said skin portion, i.e., a relative size of a shadow of the skin portion. The relative size of the shadow of the skin portion tends to be small when the distribution of material is close to an arrangement as an extrusion, i.e., when the skin portion is almost orthogonal to the plane. In other words, using the ratio as does the method is a particularly efficient and robust manner for detecting extrusions. Furthermore, the computed ratio corresponds to the ratio of two integral quantities each being only dependent on positional parameters (i.e., the area of an orthogonal projection of the skin portion and the area of the skin portion). Thereby, the computed ratio is more robust against noise in the provided CAD model (e.g., noise due to outlier points, notably for a 3D point cloud, or the non-smoothness of the outer surface of the CAD model, notably for a 3D mesh).

In addition, the method enables the detection of an extrusion surface having a general extrusion profile. In such examples, the distribution of material is arranged around the extrusion axis according to the general profile of extrusion. The general profile may be a canonical (geometric) primitive or a non-canonical (geometric) primitive. A non-canonical primitive, unlike canonical primitives (e.g., a circle, or a regular polygon) may not be fitted or parameterized by simple primitives but may still be parameterized using suitable tools (e.g., NURBS). Further to this, the method forms an improved solution for detection of an extrusion surface as the computing of ratio is applicable when the skin portion is not simply connected (e.g., when the skin portion has a hole), or for general discrete geometrical representations of the model (e.g., uniform or non-uniform, triangular or other types of mesh). Thus, the extrusion detection forms an improved solution by being applicable to detect extrusion in general CAD models of a mechanical part in a manufacturing CAD process, including extrusions obtained from non-canonical profiles.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of providing a CAD 3D model of the mechanical part may be triggered upon an action of the user. For example, the action may comprise importing, loading, or creating the CAD 3D model by the user. Similarly, the step of providing an extrusion axis may be triggered upon an action of the user. For example, the action may comprise selecting an axis of a (reference) coordinate system, or selecting a line, segment, or an edge of a loaded part, or by inserting data defining the extrusion axis.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

The method generally manipulates modeled objects, such as the CAD 3D model. A modeled object is any object defined by data stored e.g., in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object or 3D model, e.g., representing a product such as a part or an assembly of parts, or possibly an assembly of products. By "3D modeled object" or "3D model", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

The 3D modeled object or 3D model may represent the geometry of a product to be manufactured in the real world subsequent to the completion of its virtual design with for instance a CAD software solution or CAD system, such as a (e.g., mechanical) part or assembly of parts (or equivalently an assembly of parts, as the assembly of parts may be seen as a part itself from the point of view of the method, or the method may be applied independently to each part of the assembly), or more generally any rigid body assembly (e.g., a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

The 3D model may form a discrete geometrical representation of a 3D real-world object, e.g., representing an object from the real world such as a mechanical part. The discrete geometrical representation is a data structure which comprises a discrete set of pieces of data. Each piece of data may be equivalently referred to as a discrete element. Each piece of data represents a respective geometrical entity positioned in a 3D space. Each geometrical entity represents a respective location of the 3D object (in other words, a respective portion of material constitutive of a solid represented by the 3D object). The aggregation (i.e., union or juxtaposition) of the geometrical entities represents altogether the 3D object. The discrete geometrical representation may in examples comprise a number of such pieces of data higher than 100, 1000, or 10000.

The discrete geometrical representation may for example be a 3D point cloud, each geometrical entity being a point. The discrete geometrical representation may alternatively be a 3D mesh, each geometrical entity being a mesh tile or face. The 3D mesh may be regular or irregular (i.e., consisting or not of faces of a same type). The 3D mesh may be a polygonal mesh, for example a triangular mesh. The 3D mesh may be obtained from a 3D point cloud, for example by triangulating the 3D point cloud (e.g., with a Delaunay triangulation).

The 3D point cloud or 3D mesh may be determined from physical measurements on a real object, for example within a reconstruction process. The 3D reconstruction process may comprise providing the real object, providing one or more physical sensors each configured for acquiring a respective physical signal, and acquiring one or more respective physical signals by operating the one or more physical sensors on the real object (i.e., scanning the real object with each sensor). The 3D reconstruction may then automatically determine a 3D point cloud and/or a 3D mesh based on the measurements, according to any known technique. The one or more sensors may comprise a plurality of (e.g., RGB, and/or image or video) cameras and the determination may comprise a structure-from-motion analysis. The one or more sensors may alternatively or additionally comprise one or more depth sensors (e.g., on an RGB-depth camera) and the determination may comprise a 3D reconstruction from depth data. The one or more depth sensors may for example comprise a laser (e.g., a lidar) or an ultrasound emitter-receiver. The 3D reconstruction process may be a part of a reverse engineering process to obtain a CAD model for the real object. The extrusion detection method may thus form an improved solution in processing the physical measurement in order to obtain a CAD model as the method provides a robust test for extrusion detection based on the CAD model. The extrusion detection method is in particular robust against noise in the physical measurements (e.g., noise in the output of the sensors, or the precision of the sensors) as it computes the ratio between two areas, i.e., two integral values and only depends on positional parameters. Such an integral computation improves the robustness against the local (e.g., pointwise) noise.

The 3D point cloud or 3D mesh may alternatively be obtained from a 3D modeled object representing a skin (i.e., outer surface) of a solid or mechanical part for example by ray casting on the 3D modeled object or tessellating the 3D modeled object. The tessellating may be performed according to any 3D modeled object rendering process. Such a rendering process may be coded on any CAD system in order to display a graphical representation of the 3D modeled object. The 3D modeled object may be designed or have been designed by a user with a CAD system.

A CAD system may be history-based. In this case, a modeled object is further defined by data comprising a history of geometrical features. A modeled object may indeed be designed by a physical person (i.e., the designer/user) using standard modeling features (e.g., extrude, revolute, cut, and/or round) and/or standard surfacing features (e.g., sweep, blend, loft, fill, deform, and/or smoothing). Many CAD systems supporting such modeling functions are history-based system. This means that the creation history of design features is typically saved through an acyclic data flow linking the said geometrical features together through input and output links. The history of the part is the design intent. Basically, the history gathers the information on the operations which the modeled object has undergone, thereby enabling design changes of the part according to the design intent. The history based modeling paradigm may be realized according to any of known methods in the art.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values. For example, a PLM system may manage fabrication tolerances, for example, in machining or molding regarding a provided extrusion feature in a CAD model.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. For example, a CAM solution may provide the information regarding machining parameters, or molding parameters coherent with a provided extrusion feature in a CAD model. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality of components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, salespeople and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

FIG. 1 shows an example of the GUI of the system, wherein the system is a CAD system. The model 2000 is an example of the CAD 3D model provided to the method. The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g., change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature-tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 2:
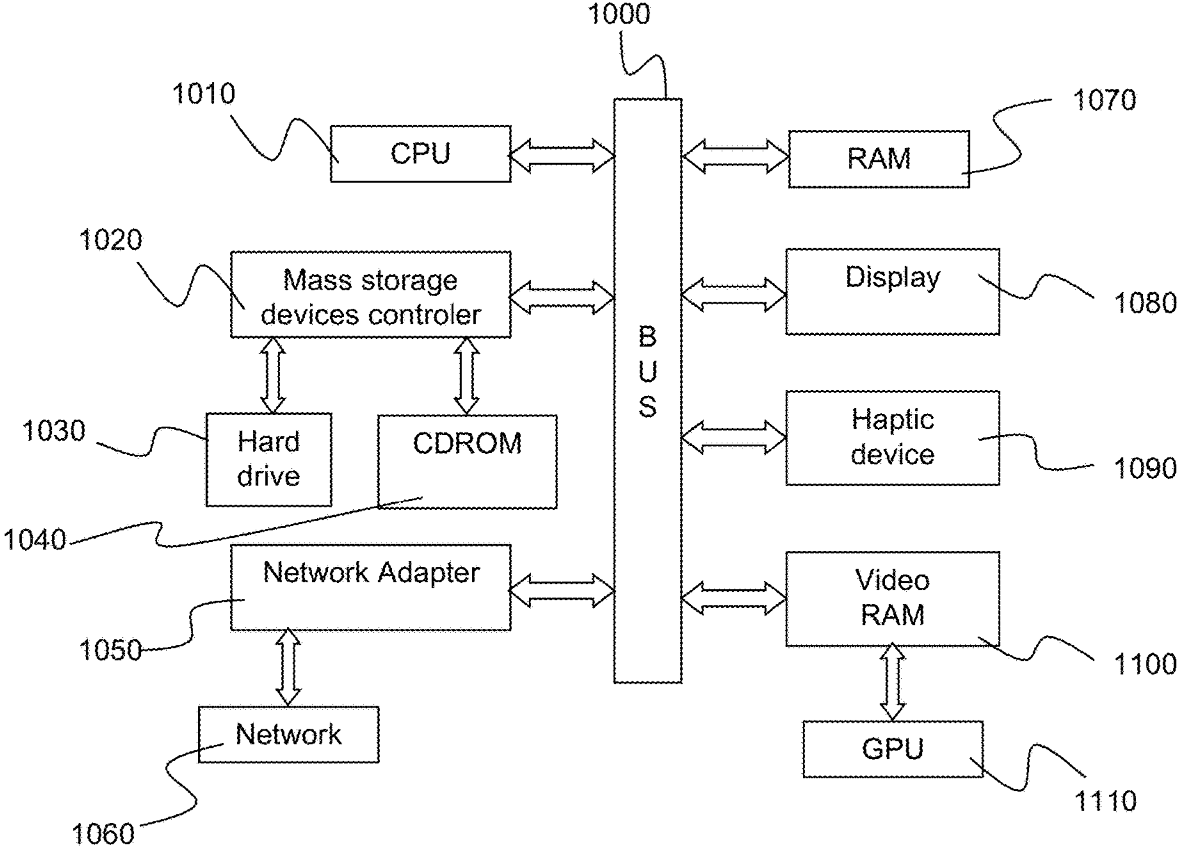
FIG. 2 shows an example of the system.

FIG. 2 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

As previously discussed, the extrusion detection method may be part of a manufacturing CAD design method. The design method may comprise designing and/or editing the CAD 3D model. Designing a CAD 3D model designates any action or series of actions which is at least part of a process of elaborating a CAD 3D model. The method may comprise providing a CAD 3D model previously created, and then modifying the CAD 3D model based on the determination of an extrusion surface. The modeled object by the CAD 3D model may be a modeled solid (i.e., a modeled object that represents a solid). The manufacturing object may be a product, such as a part, or an assembly of parts.

The method comprises providing a CAD 3D model of the mechanical part. The CAD 3D model includes a skin portion representing an outer surface of the portion of the mechanical part. The portion of the mechanical part may be a strict portion of the mechanical part, which comprises then other portions. The method detects whether the distribution of material of this portion is arranged as an extrusion. The method may also be iterated, i.e., applied to one or more other portions of the mechanical part, each application of the method to a respective other portion determining whether or not the distribution of material of this respective other portion is arranged as an extrusion. Alternatively, the portion of the mechanical part may be the mechanical part itself, and in this case the method determines whether or not the distribution of material of the mechanical part itself is arranged as an extrusion. For example, a nut may have a distribution of material arranged as an extrusion. The portion of the mechanical part may be created by a machining process, an additive manufacturing process and/or molding.

By "outer surface" it is meant a surface in contact with a medium other than the mechanical part, e.g., another mechanical part or air. In other words, the outer surface forms a delimitation between the outside of the mechanical part and the inside of the mechanical part at the portion. By "skin portion", it is meant any surface representation (open surface or closed surface) of the outer surface (or "skin") of the portion of the mechanical part. The skin portion may represent at least a part of a boundary (i.e., surface) of the respective 3D model, said at least a part of the boundary representing the outer surface. In other words, skin portion is a part of the provided 3D model of the mechanical part corresponding to the outer surface of the mechanical part. In yet other words, while the CAD 3D model altogether represents the mechanical part, the skin portion is a part of the CAD 3D model that represents the outer surface of the portion of the mechanical part. The skin portion may be a strict portion of the boundary of the provided CAD 3D model, in the case where the portion is a strict portion of the mechanical part. The 3D model comprises in this case other portions each representing another respective portion of the mechanical part. Alternatively, the skin portion may be the outer boundary of the CAD 3D model, in the case where the portion is the mechanical part itself.

The method may comprise prior to providing the CAD 3D model, performing a method of segmentation. The method of segmentation may provide one or more segments of the CAD 3D model. The skin portion may comprise or consist of one or more segments of the CAD 3D model obtained in the segmentation process, for example a union of side surfaces of a polygonal prism, each surface outputted as a distinct segment.

As discussed above, the providing of the CAD 3D model may comprise measuring or acquiring the CAD 3D model, e.g., by providing physical sensors and operating them on the mechanical part (e.g., this may for example consist in scanning the mechanical part), and then performing a 3D reconstruction process to obtain the 3D model. Alternatively, the providing of the 3D model may comprise creating the 3D model, e.g., by sketching it. In yet another alternative, the providing of the 3D model may comprise retrieving the 3D model from a (e.g., distant) database on which the 3D model has been stored further to its creation or acquirement.

The method further comprises providing an extrusion axis. The providing of the extrusion axis may comprise retrieving the extrusion axis from a (e.g., distant) memory. Alternatively, the providing of the extrusion axis may comprise determining/computing the extrusion axis, by any suitable method. The extrusion axis represents a potential candidate axis along which the method verifies if the material distribution is arranged as an extrusion.

Further to the providing, the method determines whether or not the distribution of material is arranged as an extrusion by computing and using a ratio of an area of an orthogonal projection of the skin portion on a plane orthogonal to the extrusion axis, over an area of the skin portion. In other words, the ratio is equal to said area of the orthogonal projection divided by said area of the skin portion. For that, the method comprises, further to the providing, computing said ratio. The orthogonal plane may be placed anywhere along the extrusion axis, for example the plane passing through the origin of a reference coordinate system wherein the 3D model is defined. The area of the skin portion may be computed by any known method in the field of CAD. The area (e.g., the exact value of the area) of the skin portion may be provided as a part of the information embedded in the CAD model. The computing of the area of the orthogonal projection of the skin portion may comprise computing the projection of the skin portion and computing the area (e.g., the exact value of the area up to a floating-point precision) of the projected skin portion by any known method in the field of CAD. Alternatively, the computing of the area of the projected skin portion may comprise computing an approximation (e.g., a proxy) thereof. Computing an approximation of the projected area may form an improved solution as it is computable faster.

The method further comprises determining whether or not the distribution of material is arranged as an extrusion, by determining whether or not the outer surface is an extrusion surface based on the ratio and a ratio threshold. The outer surface is determined to be an extrusion surface when the ratio is lower than the ratio threshold, and the outer surface is determined not to be an extrusion surface otherwise. By "extrusion surface" it is meant a surface resulting from sliding a profile (i.e., an extrusion profile) along an extrusion axis (e.g., a straight axis). The ratio threshold may be predetermined before the start of the method or may be adaptively set during the execution of the method and optionally according to the provided CAD 3D model. In examples where the providing of the CAD 3D model comprises measuring or acquiring, the ratio threshold may be set according to the measurement or acquirement accuracy such that the value of the ratio threshold is smaller when the measurement or acquirement accuracy is higher. For example, the value of the ratio threshold may be inversely proportional to the scanning accuracy or sensors accuracy. In examples where the provided CAD model forms a discrete geometrical representation, the ratio threshold may be set according to the number of pieces of data (i.e., the number of geometrical entities or discrete elements) of the discrete geometrical representation such that the value of the ratio threshold is smaller when the number of pieces of data is higher. For example the value of the ratio threshold may be inversely proportional to the number of pieces of data of the discrete geometrical representation. According to these examples, the higher the number of pieces of data included in the discrete geometrical representation of the CAD model, the smaller is the value of the ratio threshold. Alternatively or additionally, the ratio threshold may be set according to a maximum deviation angle of the skin portion with respect to the extrusion axis. The maximum deviation angle of the skin portion is a maximum of deviation angles of points on the skin portion. The deviation angle of a point on the skin portion is an angle between the extrusion axis, and a line connecting the respective point and a reference point on the extrusion axis. The value of the ratio threshold may be equal to a sinus function applied on the maximum authorized deviation angle (e.g., $\eta=\sin(\alpha)$). The maximum deviation angle may be set smaller when the measurement or acquirement accuracy is higher (if the CAD model comprises measuring or acquiring) and/or when the number of pieces of data is higher (if the CAD model forms a discrete geometrical representation). The method may set the maximum authorized deviation angle to a value in the interval $$\left]0, \frac{\pi}{20}\right[,$$

for example $$\frac{\pi}{30}.$$

In examples, if the method determines that the outer surface is an extrusion surface, the method may further comprise adding a specification to the 3D model accordingly. For example, the method may comprise processing the skin portion, e.g., by computing extrusion parameters (e.g., including extrusion profile). In particular examples, the method may comprise computing an extrusion profile based on the extrusion axis for example according to the method disclosed in European Patent Application No. 21305671.6 filed on 21 May 2021 by DASSAULT SYSTEMES, which is incorporated herein by reference. Specifically, the method may comprise a step of parameterizing the extrusion surface, i.e., determining one or more distributions of values each of a respective parameter of the skin portion, by applying the computer-implemented method for parameterization disclosed in European Patent Application No. 21305671.6 filed on 21 May 2021 by DASSAULT SYSTEMES, notably examples of this parameterization method wherein the distribution of material is arranged as an extrusion. The application of this parameterization method may comprise a step of computing a profile based on each determined distribution of values as disclosed in previously-cited European Patent Application No. 21305671.6 filed on 21 May 2021 by DASSAULT SYSTEMES. The method may optionally comprises creating a corresponding extrusion feature based on the provided extrusion axis and the computed extrusion parameters. The method may further optionally comprise saving/storing the created extrusion feature. The saved/stored feature may later be used in a feature-tree creation/obtention process. The feature-tree creation process may integrate the extrusion feature created by the method into a feature-tree of the CAD 3D model. The method may further store the computed extrusion parameters (optionally, associated with the extrusion axis) on persistent memory.

In examples, if the method determines that the outer surface is not an extrusion surface, execution of the method may stop (i.e., nothing occurs and the 3D model remains unchanged). The method may alternatively output an information that the extrusion detection result is negative. This information avoids a false extrusion to be further used as such, e.g., in a subsequent design step. Using a false extrusion in a manufacturing CAD design process could lead to design errors that have a risk to be later reverberated in a downstream manufacturing process.

The computing of the ratio may include performing a Monte-Carlo method. By "Monte-Carlo method", which may be equivalently referred to as "Monte-Carlo experiment", it is meant a method that relies on repeated random sampling to obtain numerical results. As known per se, a general Monte-Carlo method may comprise setting a domain of possible inputs, generating inputs randomly from a probability distribution over the domain, performing a deterministic computation on the inputs, and aggregating the results. Performing a Monte-Carlo method for the computing of the ratio allows computational efficiency and provides improved robustness. Indeed, the Monte-Carlo method does not depend on the mesh type (uniform or not, triangles or not), or topology (e.g., there can be holes in the mesh), and it offers theoretical guaranties of convergence and a control over approximation error.

In examples, the Monte-Carlo method may comprise providing a bounded domain. The bounded domain may be a 3D domain that encompasses the CAD 3D model or at least the skin portion thereof. The bounded domain may be a 3D bounding box for the CAD 3D model or at least the skin portion thereof. Alternatively, the bounded domain may be a 2D domain that encompasses a projection of the CAD 3D model or at least the skin portion on a plane. In particular examples, the bounded domain may be a 2D bounding box respective to the projection on a plane.

The Monte-Carlo method may further comprise sampling points of the bounded domain according to a probability distribution. The probability distribution may be represented by a respective probability density function (PDF) as known per se in the field of statistics. In examples, the probability distribution may be a uniform probability distribution or a non-uniform probability distribution. The probability distribution may be defined on the bounded domain, i.e., the probability for each of the sampled points to reside inside the bounded domain is 1 (i.e., 100%). In yet other words, each sampled point resides inside the bounded domain. The respective PDF may attribute a probability density value to each of the points inside the bounded domain. In examples, the inside of the bounded domain may include the boundaries of the bounded domain. The sampling may be the output of a Metropolis-Hastings algorithm, or any other algorithm or method that is able to sample values according to a probability distribution.

The probability distribution, and the respective PDF thereof, may be a continuous probability distribution. The method may thereby sample the points of the bounded domain from one or more continuous sets of numbers, each set being associated to one of the coordinates of the sampled point in a system of coordinates. Alternatively, the probability distribution, and the respective PDF thereof, may be a discrete probability distribution. The method may thereby sample the points of the bounded domain from one or more discrete sets of numbers representing a granularity of a respective coordinate of the sampled point in a system of coordinates.

The Monte-Carlo method may further comprise, for each sampled point, determining whether or not a respective line passing through the sample point and parallel to the extrusion axis, intersects the skin portion. For each sampled point, determining whether or not the respective line passing through the point and parallel to the extrusion axis intersects the skin portion may be carried out by any suitable method. For example, this determining may comprise determining whether or not the sampled point belongs to (i.e., is inside) the orthogonal projection of the skin portion on the plane orthogonal to the extrusion axis. Alternatively, this determining may comprise applying a ray casting method, for example comprising casting a ray from the sampled point and parallel to the extrusion axis and detecting whether or not the ray intersects the skin portion.

The area of the orthogonal projection of the skin portion may be proxied by a product between an estimation of an expectation of lines intersecting the skin portion, and an area of the bounded domain. The area of the orthogonal projection of the skin portion may be equivalently referred to as the "shadow" (of the skin portion). By "an expectation" it is meant a statistical expected value according to the probability distribution. As known per se in statistics, the expected value is defined to be the probability-weighted average of an event (e.g., intersection of a line with a skin portion) according to a probability distribution. The area of the bounded domain may be defined according to any known measure (e.g., the Lebesgue measure) and may be computed according to the any known method in the field of CAD.

The number of sampled points may be for example larger than 100, 1000, or 10000. The number of sampled points may be predetermined. The method may set the number of sampled points adaptively according to a convergence criterion (i.e., a stopping condition). The convergence criterion may be based on a difference between two consecutive estimations of the expectation of lines intersecting the skin portion. The consecutive values may be evaluated after performing a number of samplings, for example after each 1, 10, 100, or 1000 samplings. The sampling may be stopped if the difference and/or relative difference between the two consecutive estimations is less than a threshold. Alternatively or additionally, the convergence criterion may be based on a variance/standard deviation estimator of the expectation estimation of the lines intersecting the skin portion. The sampling may be stopped if the estimated variance/standard deviation is less than a variance/standard deviation threshold, optionally if a minimum number of sampled points been already obtained. In examples, the variance/standard deviation threshold may be a value in the interval [0,1], for example a value smaller than 0.01. The minimum number of sampled points may be larger than 10, 100, or 1000. Yet, alternatively or additionally, the method may set the number of samplings according to the probability distribution. The number of samplings may be set higher when the probability distribution is a uniform distribution and may be set lower when the probability distribution is non-uniform, for example when the probability distribution has higher value for the respective density of probability around the skin portion or a projection thereof. This forms an improved solution as the computing of the ratio is obtained via a Monte-Carlo simulation based on a sufficiently large sampling according to the convergence criteria.

In examples, the estimation of the expectation of lines intersecting the skin portion may equal an average of the values of an intersection function. The intersection function represents the intersection of a line with the skin portion at each sampled point. In other words, the intersection function may take a point (e.g., a sampled point) as an input, by for example processing respective coordinates of the point, and output whether or not a respective line passing through the point and parallel to the extrusion axis, intersects the skin portion. In other words, the output of the intersection function is, for each input sampled point, the result of the previously-discussed determining whether or not a respective line passing through the sample point and parallel to the extrusion axis, intersects the skin portion. In examples, the intersection function may output a first value (e.g., the unity divided by the value of a respective PDF at the point) if the respective line intersects the skin portion and a second value (e.g., zero) otherwise. Alternatively, the estimating of the expectation may be computed by any other statistical estimator as known in the field.

The method may further include computing the orthogonal projection of the skin portion. The orthogonal projection is the orthogonal projection on a plane orthogonal to the extrusion axis. The orthogonal projection may be obtained according to any known method for computing an orthogonal projection in the field of CAD. In examples where the provided CAD model forms a discrete geometrical representation having discrete elements, the orthogonal projection may comprise projection of each of the discrete elements. The bounded domain may lie on the plane orthogonal to the extrusion axis (i.e., being a 2D bounded domain) and may encompass the orthogonal projection of the skin portion. For each sampled point, the determining (of whether or not the respective line passing through the sample point and parallel to the extrusion axis intersects the skin portion) may include determining whether or not the sampled point is inside the projection of the skin portion on the bounded domain, by using any suitable method.

The probability distribution may have a strictly positive density of probability, i.e., the value for the respective PDF. In examples, the probability distribution may be a uniform distribution, i.e., the respective density of the probability may have a constant value over the bounded domain. The constant value may equal the unity divided by an area of the bounded domain, i.e., equal the inverse of said area. In particularly efficient examples, the probability distribution may be a non-uniform distribution with higher value for the respective density of the probability on the projection of the skin portion.

The intersection function may be an indicator function divided by the density of probability. The indicator function indicates for a position on the bounded domain whether or not said position belongs to (i.e., is inside) the orthogonal projection of the skin portion. Indicator functions may be equivalently referred to as characteristic functions. In examples, the intersection function may output a value of 1 if said position is inside the orthogonal projection and a value of 0 otherwise.

The providing of the extrusion axis may comprise determining the extrusion axis by optimizing an objective function. The objective function penalizes non-orthogonality of a normal of the skin portion to a candidate extrusion axis (i.e., free variable of the optimization). The optimization may be a minimization. The optimization is based on a criterion that the objective function value must be lower than an objective-function-value threshold. In other words, the optimization evaluates (e.g., iteratively) the value of the objective function for several candidate extrusion axis (i.e., extrusion axis each forming an attempt of the optimization) as long as the value is not both lower than the threshold (e.g., the value respects the criterion) and sufficiently low (e.g., with respect to a convergence criterion). The function penalizes non-orthogonality of a normal of the skin portion to a candidate extrusion axis in that the function tends to have a high value when the candidate extrusion axis and the normal tend not to be orthogonal. The penalization may be in form of an integral of a measure of non-orthogonality of the normal of the skin portion to the candidate extrusion axis. The measure of non-orthogonality may be a squared value of an inner product between the normal of the skin portion and the candidate extrusion axis. The criterion may be set as a constraint inside the optimization or as a post-check.

Examples of determining the extrusion axis by optimizing an objective function are now discussed.

In general, a skin portion $S \subset \mathbb{R}^3$ representing an outer surface of a portion of a mechanical part is an extrusion surface if and only if it satisfies the following condition:

$$\exists\, u \in \mathbb{R}^3 \backslash \{(0,0,0)\}: \forall\, p \in S,\ n_p \cdot u = 0,$$

where $n_p$ is the normal vector to the surface S at point p. The normal vector may be an outward normal to the surface of the body, i.e., a normal which directs the outside of the mechanical part.

The method may consider for the optimization a relaxed condition of $n_p \cdot u=0$ for all $p \in S$, by considering the objective function to optimize $\mathcal{J}_E: \mathbb{R}^3 \rightarrow \mathbb{R}_+$ $$\mathcal{J}_E(u) = \frac{1}{\mathcal{A}_S} \int_S (u \cdot n_p)^2 dvol_S,$$

where $\mathcal{A}_S = \int_S dvol_S$ and $vol_S$ is the canonical measure on S (i.e., the measure induced by the Lebesgue measure on $\mathbb{R}^3$). The objective function $\mathcal{J}_E(u)$ penalizes the non-orthogonality of the normal $n_p$ a candidate extrusion axis u.

In particular, the method may comprise determining the extrusion axis (i.e., the minimizer of the objective function) based on a criterion that the objective function value must be lower than an objective-function-value threshold $\epsilon > 0$, i.e., $$\min\{\mathcal{J}_E(u) \mid u \in \mathbb{R}^3, |u| = 1\} \leq \epsilon.$$

The objective function $\mathcal{J}_E(u)$ may take values between 0 and 1 (as a mean of squared cosines of angles between two unit-vectors, u and $n_p$). The objective-function-value threshold may be set to a predetermined value or may be adaptively set according to the provided CAD model. In particular, the value of the objective-function-value threshold may be set according (e.g., proportional) to a noise level in the provided CAD 3D model. The objective-function-value threshold may be set to a value in the interval]0, 0.1],]0, 0.01],]0, 0.005], or ]0, 0.001]. In examples, the objective-function value threshold may be set as $\epsilon = 1 \times 10^{-3}$.

Noticing that $\mathcal{J}_E(u) = u^T T_S u$ when the matrix $T_S$ is defined as:

$$T_S = \frac{1}{\mathcal{A}_S} \int_S nn^T dvol_S.$$

Thereby the optimization problem is equivalent to finding the smallest eigenvalue $\lambda_e$ of $T_S$ as well as its associated eigenvector $u_e$ up to the threshold condition, where $\lambda_e = \mathcal{J}_E(u_e)$ is the minimum value of the objective function of the optimization problem. Thereby the method may determine the extrusion axis by optimizing an objective function via computing the smallest eigenvalue and the respective eigenvector of the matrix $T_S$. The smallest eigenvalue and the respective eigenvector may be computed according to any known method. The method may further verify if the criterion $\lambda_e \leq \epsilon$ is satisfied. If the condition $\lambda_e \leq \epsilon$ is verified, the extrusion detection method is provided with the extrusion axis $u_e$, and optionally the associated eigenvalue $\lambda_e$. In other words, the determining of the extrusion axis outputs $u_e$, and optionally $\lambda_e$.

The determining of the extrusion axis by optimizing an objective function as discussed above may serve different goals in the method for material extrusion detection.

According to a first aspect, the extrusion axis obtained by the optimization as discussed above (i.e., $u_e$) may be used to be provided to the method for material extrusion detection. According to the first aspect, the criterion that the (minimum) value of the objective function (i.e., $\lambda_e$) must be lower than the objective-function-value threshold may be considered as a criterion to obtain a relevant extrusion axis (the respective eigenvector of the minimum eigenvalue $\lambda_e$) for the provided CAD model. According to the first aspect, the method of extrusion detection further verifies (i.e., confirms or not) that the distribution of material is arranged as an extrusion with respect to the extrusion axis obtained by the optimization. In other words, according to the first aspect, the determining of whether or not the distribution of material is arranged as an extrusion based on the ratio acts as a verification step, for verifying that the extrusion axis provided to the method as determined by the optimization is indeed an extrusion axis for the distribution of material. In the first aspect, the method thus adds robustness to the optimization.

According to a second aspect, the determining of the extrusion axis is an initial verification step for the method of material extrusion detection. According to the second aspect, the criterion that the (minimum) value of the objective function must be lower than some small value (e.g., the objective-function-value threshold) may be considered as a criterion to verify that the distribution of material is arranged as an extrusion. In examples, the extrusion detection method may be preceded by one or more verification steps. In other words, according to the second aspect, the optimization acts as a first verification step for verifying whether or not the distribution of material is arranged as an extrusion. The determining of whether or not the distribution of material is arranged as an extrusion based on the ratio acts as a second and subsequent verification step, also for verifying whether or not the distribution of material is arranged as an extrusion. In the second aspect, the method thus provides a two-step approach for detecting extrusions, which improves robustness.

In examples where the CAD model forms a discrete geometrical representation for example a 3D mesh or a point cloud, the calculation of $T_S$ may only use an associated normal vector and an area to each of the discrete elements of the discrete geometrical representation. For example, for a triangular mesh $\mathcal{M}(\mathcal{V}, \varepsilon, \mathcal{F})$ provided as the CAD model and where the skin portion $\mathcal{S}$ is defined as a piecewise linear surface, $T_S$ may be calculated as $$T_S = \frac{1}{\sum_{\tau\in\mathcal{F}} \mathcal{A}_\tau} \sum_{\tau\in\mathcal{F}} \mathcal{A}_\tau n_\tau n_\tau^T,$$

where $\mathcal{F}$ is the set of triangle faces of the mesh, $\mathcal{A}_\tau$ is the area of triangle $\tau\in\mathcal{F}$ and $n_\tau$ is the normal vector of triangle $\tau\in\mathcal{F}$.

In examples, the objective-function-value threshold may be two times, ten times or twenty times larger than a square of the ratio threshold.

In examples, the 3D model may be a 3D mesh having discrete elements. The 3D mesh may be obtained as a result of a tessellation of the CAD 3D model. The ratio threshold may be inversely proportional to the number of discrete elements of the 3D mesh.

In examples, the method may further comprise computing an extrusion profile based on the extrusion axis. The method may compute the extrusion profile after the outer surface has been determined to be an extrusion surface. The method may compute the extrusion profile based on the orthogonal projection of the skin portion on the orthogonal plane. The method may compute the extrusion profile according to any known method. In examples where the 3D model is a point cloud, the method may fit a curve to projected skin portion to compute the extrusion profile according to Wang et al., "*Fitting B-spline curves to point clouds using curvature-based square distance minimization*", CM Transactions on Graphics, 25 (2), 2006, pp. 214-238, which is incorporated herein by reference. In other examples where the 3D model is a point cloud, the method may compute a parameterization of the projected skin portion and fits a curve using the parameterization according to Goshtasby, "*Grouping and parameterizing irregularly spaced points for curve fitting*", ACM Transactions on Graphics, 19 (3), 2000, pp. 185-203, which is incorporated herein by reference. In examples where the 3D model is a 3D mesh, the method may compute a parameterization of the mesh and fits a curve on the projected skin portion (and the projected mesh) using the parameterization according to the method disclosed in previously-cited European Patent Application No. 21305671.6 filed on 21 May 2021 by DASSAULT SYSTEMES. Specifically, the method may comprise a step of parameterizing the extrusion surface, i.e., determining one or more distributions of values each of a respective parameter of the skin portion, by applying the computer-implemented method for parameterization disclosed in European Patent Application No. 21305671.6 filed on 21 May 2021 by DASSAULT SYSTEMES, notably examples of this parameterization method wherein the distribution of material is arranged as an extrusion. The application of this parameterization method may comprise a step of computing a profile, for example by fitting one or more curves, based on each determined distribution of values as disclosed in previously-cited European Patent Application No. 21305671.6 filed on 21 May 2021 by DASSAULT SYSTEMES. Alternatively or additionally, the method may further comprise computing extrusion height limits delimiting the extrusion along the extrusion axis. The method may compute the height limits by computing a minimum and a maximum value of a projection of vertices of a 3D mesh (when the 3D model is a mesh) or points of a point cloud (when the 3D model is a point cloud) on the extrusion axis.

Implementations of the method are now discussed.

In the implementations, a CAD 3D model representing a portion of a mechanical part in the form of a 3D triangle mesh, $\mathcal{M}(\mathcal{V}, \mathcal{F})$, is provided as input to the method. In examples, the portion of the mechanical part is a strict sub-portion, and the mesh may be a sub-mesh of a larger mesh representing the whole mechanical part. The mesh represents a piecewise linear surface $\mathcal{S}$, where $\mathcal{V}$ is the set of vertices, $\varepsilon$ is the set of edges, and $\mathcal{F}$ is the set of triangle faces. In order to get a potential extrusion axis, the implementations compute $$T_S = \frac{1}{\sum_{\tau\in\mathcal{F}} \mathcal{A}_\tau} \sum_{\tau\in\mathcal{F}} \mathcal{A}_\tau n_\tau n_\tau^T$$

which is a 3×3 positive semi-definite symmetric matrix. The method obtains (at least an approximation of) the smallest eigenvalue $\lambda_e$ of $T_S$ and the associated eigenvector $u_e$. The value of the objective-function-value threshold $\epsilon$ is set to $10^{-1}$ as this step may not be required to be too strict in ruling out the non-extrusion surfaces.

Then a direct orthonormal basis ($e_1$, $e_2$, $e_3$) of $\mathbb{R}^3$ is formed by setting $e_3=u_e$. For a span $$\{e_1, e_2\} = u_e^\perp,$$

a reduction map, i.e., a projection map is defined as:

$$n_e: \left| \begin{array}{l} \mathbb{R}^3 \to \mathbb{R}^2 \\ v \mapsto \begin{pmatrix} e_1 \cdot v \\ e_2 \cdot v \end{pmatrix} \end{array} \right. .$$

Then a sufficiently large open set (e.g., bounded domain) $\Omega\subset\mathbb{R}^2$ is set such that the shadow of S, i.e., $S_\pi=\Pi_e(S)$ satisfies $S_\pi\subset\Omega$. For instance, $\Omega$ may be a bounding box of $\Pi_e(\mathcal{V})$, the image of all the vertices.

A probability space ($\Omega$, $\mathcal{B}$, $\mathbb{P}$) may be defined on $\Omega$ together with its Borel $\sigma$-algebra $\mathcal{B}$ and a probability measure $$\mathbb{P} = \frac{1}{\mu(\Omega)}\mu,$$

where $\mu$ is the Lebesgue measure on $\mathbb{R}^2$. Then, the area of the shadow may be defined as $$\mu(S_\pi)=\mu(\Omega)\mathbb{P}(S_\pi).$$

For random variable $X=id_\Omega$, where $id_\Omega$ is an identity map on $\Omega$, i.e., id(x)=x for any $x\in\Omega$, and the indicator function $f$ as $$f:\left|\begin{array}{l}\Omega\to\{0,1\}\\ \omega\mapsto 1_{\{\omega\in S_\pi\}}\end{array}\right.$$

it holds that the expectation and variance are:

$$E(f(X))=\mathbb{P}(S_\pi),$$

$$V(f(X))=\mathbb{P}(S_\pi)(1-\mathbb{P}(S_\pi)).$$

Now let $\rho:\Omega\to\mathbb{R}$, where $\rho(x)>0\forall x\in\Omega$, be a strictly positive density function satisfying $\int_\Omega\rho d\mathbb{P}=1$. The implementations consider a probability measure $\mathbb{P}_\rho$ on $(\Omega, \mathcal{B})$ defined as:

$$\forall B\in\mathcal{B},\ \mathbb{P}_\rho(B)=\int_B\rho(\omega)d\mathbb{P}(\omega).$$

Then an intersection function $f_\rho:\Omega\to\mathbb{R}_+$ is defined as:

$$f_\rho(\omega)=\frac{f(\omega)}{\rho(\omega)}$$

where the expectation and variance are:

$$\mathbb{E}_\rho(f_\rho(X))=\mathbb{P}(S_\pi),$$

$$\mathbb{V}_\rho(f_\rho(X))=\int_{S_\pi}\frac{1}{\rho}d\mathbb{P}-\mathbb{P}(S_\pi)^2,$$

and the standard deviation is:

$$\sqrt{\frac{\mathbb{V}_\rho(f_\rho(X))}{N}}$$

In the implementations, N statistically independent samples, $(x_1, \ldots, x_N)\in\Omega^N$, with the law of X according to $\mathbb{P}_\rho$, are sampled using a Metropolis-Hastings algorithm, or any other method that is able to sample the desired distribution $\mathbb{P}_\rho$.

For every $n\in[\![1, N]\!]$, the method computes the intersection (or indicator) function $f_p(x_n)$ (or $f(x_n)$) by detecting whether or not $x_n$ is in the shadow (or image by $\Pi_e$) of at least one of the triangles of the mesh. The implementations use the following exact computation.

Figure 3:
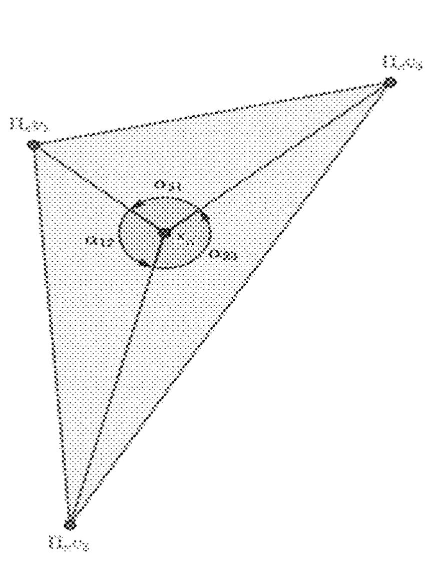
FIGS. 3, 4, 5, 6 and 7 illustrate the method.
Figure 4:
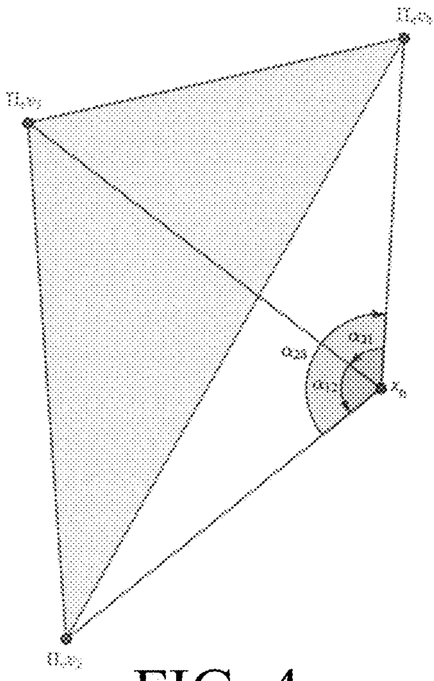

Let $(v_i, v_j, v_k)$ be the vertices of the triangle $\tau\in\mathcal{F}$. The notation $\alpha_{i_1 2_2}$ denotes the angle between a point $x_n$ and the projected vertices $v_{i_1}$ and $v_{i_2}$ of the triangle $\tau$ as:

$$\alpha_{i_1 i_2}=\arg\left(\left(\prod_e(v_{i_1})-x_n\right),\ \left(\prod_e(v_{i_2})-x_n\right)\right),$$

where $i_1$ and $i_2$ are in {i, j, k}. Mathematically, the point $x_n$ is inside the shadow of triangle if $|\alpha_{ij}+\alpha_{jk}+\alpha_{ki}|=2\pi$ (as presented in FIG. 3) and outside the shadow of triangle if $|\alpha_{ij}+\alpha_{jk}+\alpha_{ki}|=0$ (as presented in FIG. 4). The implementations may consider an approximation of this condition which is more robust against the numerical errors. In particular, implementations may consider that $x_n$ is inside the shadow of $\tau$ if and only if $|\alpha_{ij}+\alpha_{jk}+\alpha_{ki}|\geq\pi$.

Then the expectation $\mathbb{E}_p(f_\rho)$ is efficiently approximated for N large enough as:

$$\mathbb{E}_\rho(f_\rho(X))\approx P_N=\frac{1}{N}\sum_{n=1}^N f_\rho(x_n)=\frac{1}{N}\sum_{n=1}^N\frac{f(x_n)}{\rho(x_n)}.$$

$P_N$ may be replaced by any statistical estimator of $\mathbb{E}_\rho(f_\rho(X))$.

Examples of how to choose the sample size N are now discussed.

The value of N may be chosen to be a prescribed single value for all cases to be treated, for example, a value of N=1000 works well. The value of N may be chosen higher than this value for more precision or a lower than this value for more computational efficiency.

The value of N may be chosen based on a stopping condition, i.e., the method continues generating samples as long as a certain condition is not satisfied. For instance, the method may compare the value of a standard deviation estimator $\sigma_N$ of $P_N$ to a threshold $\delta$ (i.e., part of the stopping condition is $\sigma_N\leq\delta$). The standard deviation estimator of $P_N$, is an estimator of:

$$\sqrt{\frac{\mathbb{V}_\rho(f_\rho(X))}{N}}.$$

For example, $\sigma_N$ may be defined with the following formula:

$$\sigma_N=\sqrt{\frac{1}{N(N-1)}\sum_{n=1}^N(f_\rho(x_n)-P_N)^2}.$$

In addition, the value of N may be additionally chosen greater than some $N_{min}$. For example a value of $N_{min}$ around 100 yields satisfying results. Thus, the complete stopping condition in these cases may be $\sigma_N\leq\delta$ and $N\geq N_{min}$. The threshold $\delta$ is chosen in the interval]0, 1[ (the closer to 0 it is, the more confidence in the result), for example $\delta$ smaller than 0.01 yields satisfying approximation $P_N$ of $E_\rho(f_\rho(X))$.

The value of N may be chosen based on a mix of above-mentioned examples. In this case, the method may continue generating samples until either the stopping condition is satisfied or the prescribed sample size is reached.

Then the shadow area is proxied (i.e., approximated) as $\mu(\Omega)P_N$ and the ratio of the shadow area of the surface over the total surface area is computed as $$R_N = \frac{\mu(\Omega)P_N}{\mathcal{A}_S}.$$

If the mesh $\mathcal{M}$ satisfies the condition $$R_N \leq \eta$$

for a sufficiently small ratio threshold $\eta$ then the method considers the surface S as an extrusion surface (and the mesh $\mathcal{M}$ as an approximation of the extrusion surface). The ratio threshold may be set to a value in the interval$]0,\sqrt{\epsilon}]$ as $\epsilon$ set above.

The method may set $\eta=\sin(\alpha)$ for an angle $\alpha$ sufficiently small, for example a value in in the interval $$]0, \frac{\pi}{20}[.$$

Figure 5:
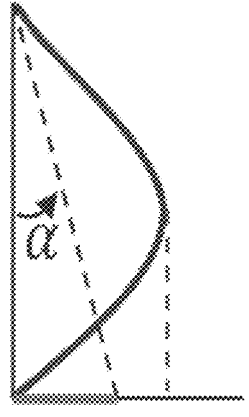
Figure 5:
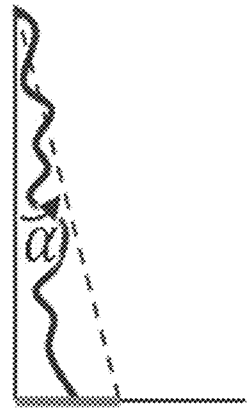

In particular, setting $$\alpha = \frac{\pi}{30}$$

yields good results. The angle $\alpha$ may be interpreted as a maximum authorized (i.e., limit) deviation angle from the extrusion axis as illustrated in FIG. 5. The ratio threshold $\eta$ may be interpreted as a certain $\sin(\alpha)$ and the objective-value threshold $\epsilon$ may be interpreted as some $(\sin(\alpha'))^2$ with $\alpha$ and $\alpha'$ representing limit deviation angles with respect to the extrusion axis.

Figure 6:
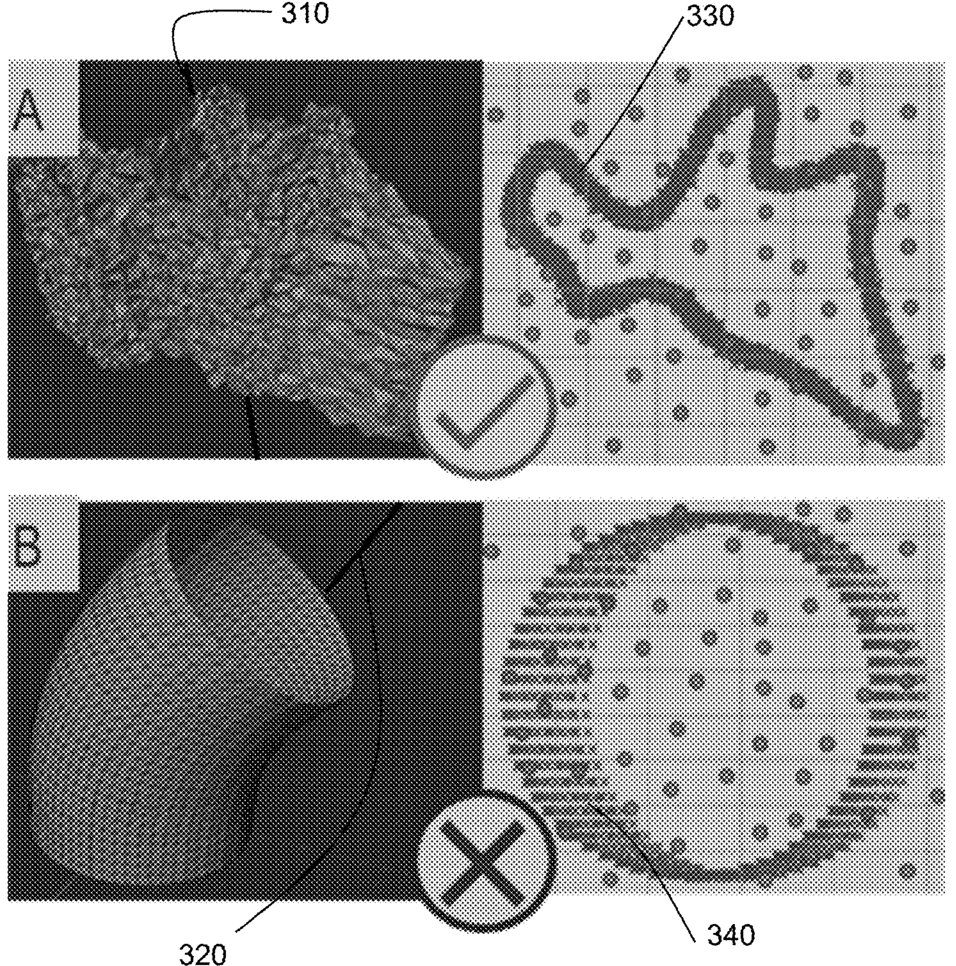
Figure 7:
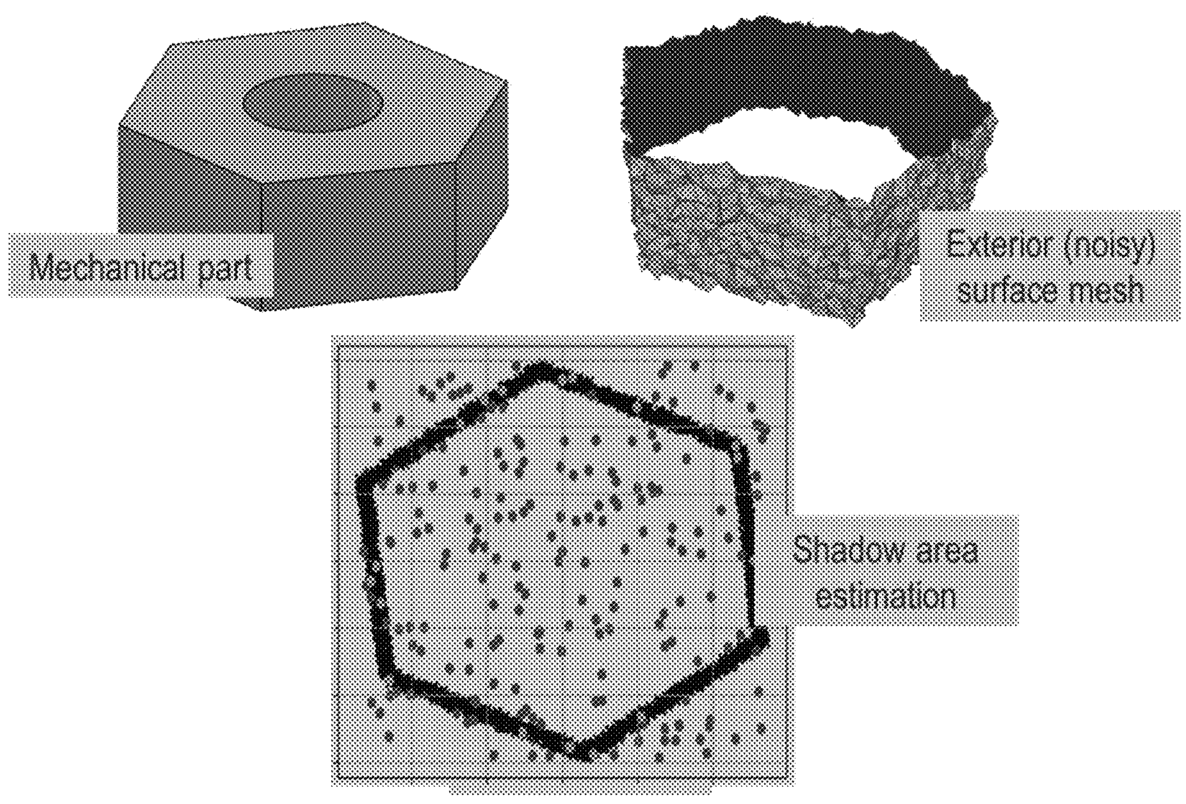

Now results obtained by the discussed implementations of the method of extrusion surface detection presented in reference to FIGS. 6 and 7.

In FIG. 6A-B two illustrations of the implementations of the method are provided. FIG. 6A presents on the left a mesh with a high noise while FIG. 6B presents on the left a mesh with a low noise. The mesh in FIG. 6B may represent a pipe connector. Among these two examples, the optimized value of the objective function $\mathcal{J}_E$ for the mesh of FIG. 6B is lower as the normal vectors on the faces of mesh of FIG. 6B undergo less variation. However, the mesh of FIG. 6A represents a true extrusion surface and the mesh of FIG. 6B does not represent an extrusion surface (but rather a piece of torus).

The disclosed implementations of the method of extrusion surface detection computes shadows of the meshes A and B with respect to the provided extrusion axes 310 and 320, respectively. The crosses 330 and 340 on FIG. 6A right and FIG. 6B right, respectively illustrate the respective areas covered by the respective shadows of the meshes A and B with respect to the computed axes. The shadow area of mesh B is significantly larger compared to the overall area of the respective 3D surface mesh, whereas the shadow of mesh A is more concentrated. The method estimates these shadow areas with a Monte-Carlo method, by sampling points on the plane around the shadow and counting (with weights, or "importance") the proportion of those points that lie in the shadow (illustrated on FIGS. 6A-6B by the points that represent the samples). If the ratio of the estimated shadow area over the total area of the mesh is larger than the ratio threshold $\eta$ (as it is the case for mesh B), the method determines that the provided portion represented by the mesh is not an extrusion surface.

Another example of the application of method is presented in FIG. 7 when the mechanical part is a nut. As depicted in FIG. 7, even though the mesh is noisy the computed shadow area of the mesh is significantly small. Thus the method determines that the provided portion is an extrusion surface.

Having detected that a surface mesh corresponds to an extrusion surface, the method may further retrieve (i.e., compute) a complete extrusion operator (i.e., feature) associated to that extrusion surface. Examples of retrieving the extrusion operator is now discussed.

An extrusion operator is defined by a 3D (extrusion) axis $u_e$, a profile, i.e., a 2D curve that does not auto-intersect, and height limits $h_{min}$, $h_{max}$ that correspond to the minimum and the maximum coordinates of the extrusion along the extrusion axis $u_e$. The extrusion axis is provided to the method.

In some examples, the method may retrieve a profile by projecting the points (of the skin portion) on a plane orthogonal to $u_e$ (e.g., using $\Pi_e$ as discussed above) and directly fit a curve to the unordered 2D point-cloud, using, for instance, the methods discussed in previously-cited reference Wang et al., "*Fitting B-spline curves to point clouds using curvature-based square distance minimization*", CM Transactions on Graphics, 25 (2), 2006, pp. 214-238.

In some examples, the method may retrieve a profile by computing a parameterization of the projected points to use and fit a curve on those points using this parameterization using, for instance, the methods discussed in previously-cited reference Goshtasby, "*Grouping and parameterizing irregularly spaced points for curve fitting*", ACM Transactions on Graphics, 19 (3), 2000, pp. 185-203.

In some examples, the method may retrieve a profile by computing a parameterization of the surface mesh and fit a curve on the projected points using the right parameter, using, for instance, the method discussed in previously-cited European Patent Application No. 21305671.6 filed on 21 May 2021 by DASSAULT SYSTEMES. Specifically, the method may comprise a step of parameterizing the extrusion surface, i.e., determining one or more distributions of values each of a respective parameter of the skin portion, by applying the computer-implemented method for parameterization disclosed in European Patent Application No. 21305671.6 filed on 21 May 2021 by DASSAULT SYSTEMES, notably examples of this parameterization method wherein the distribution of material is arranged as an extrusion. The application of this parameterization method may comprise a step of computing a profile, which may include fitting one or more curves, based on each determined distribution of values as disclosed in previously-cited European Patent Application No. 21305671.6 filed on 21 May 2021 by DASSAULT SYSTEMES. This solution is more efficient and robust and does not require a good initialization.

The method may compute the height limits as:

$$h_{min} = \min_{v \in V} v \cdot u_e \quad h_{max} = \max_{v \in V} v \cdot u_e .$$

The invention claimed is:

1. A computer-implemented method for material extrusion detection in a portion of a mechanical part having a distribution of material, the method comprising:

obtaining a computer-aided design 3D model of the mechanical part, the computer-aided design 3D model being obtained from physical measurements on the mechanical part, the computer-aided design 3D model including a skin portion representing an outer surface of the portion of the mechanical part;

obtaining an extrusion axis;

computing a ratio of an area of an orthogonal projection of the skin portion on a plane orthogonal to the extrusion axis, over an area of the skin portion; and determining whether or not the distribution of material is arranged as an extrusion, by determining that the outer surface is an extrusion surface when the ratio is lower than a ratio threshold and that the outer surface is not the extrusion surface when the ratio is not lower than the ratio threshold, wherein the ratio is of a type:

$$R_N = \frac{\mu(\Omega)P_N}{\mathcal{A}_S},$$

with $\mathcal{A}_S$ the area of the skin portion, S the skin portion, and $\mathcal{A}_S=\int_S d\mathrm{vol}_S$ where $\mathrm{vol}_S$ is a canonical measure on S, with Ω a bounded 3D domain encompassing at least the skin portion and μ(Ω) an area of the bounded 3D domain Ω, and with $P_N$ an estimation of an expected value of a number of respective lines intersecting the skin portion.

2. The method of claim 1, wherein the computing includes performing a Monte-Carlo method.

3. The method of claim 2, wherein the Monte-Carlo method includes:

obtaining the bounded domain, sampling points of the bounded domain according to a probability distribution, and for each sampled point, determining whether or not a respective line passing through the sample point and parallel to the extrusion axis, intersects the skin portion.

4. The method of claim 3, wherein the estimation of the expected value of the number of respective lines intersecting the skin portion equals an average of values of an intersection function representing the intersection of a line with the skin portion, at each sampled point.

5. The method of claim 3, further comprising computing the orthogonal projection of the skin portion, wherein the bounded domain lies on the plane orthogonal to the extrusion axis and encompasses the orthogonal projection of the skin portion, and wherein for each sampled point, the determining includes determining whether or not the sampled point is inside the orthogonal projection of the skin portion on the bounded domain.

6. The method of claim 3, wherein the probability distribution has a strictly positive density of probability.

7. The method of claim 6, wherein an intersection function is an indicator function divided by the density of probability, the indicator function indicating for a position on the bounded domain whether or not said position belongs to the orthogonal projection of the skin portion.

8. The method of any of claim 1, wherein the obtaining of the extrusion axis includes determining the extrusion axis by optimizing an objective function penalizing non-orthogonality of a normal of the skin portion to a candidate extrusion axis based on a criterion that a value of the objective function must be lower than an objective-function-value threshold.

9. The method of claim 1, wherein the 3D model is a 3D mesh, the 3D mesh having discrete elements, and wherein the ratio threshold is inversely proportional to a number of discrete elements of the 3D mesh.

10. The method of claim 1, further comprising computing an extrusion profile based on the extrusion axis.

11. A non-transitory computer readable data storage medium having recorded thereon a computer program having instructions for performing a method for material extrusion detection in a portion of a mechanical part having a distribution of material, the method comprising:

obtaining a computer-aided design 3D model of the mechanical part, the computer-aided design 3D model being obtained from physical measurements on the mechanical part, the computer-aided design 3D model including a skin portion representing an outer surface of the portion of the mechanical part;

obtaining an extrusion axis;

computing a ratio of an area of an orthogonal projection of the skin portion on a plane orthogonal to the extrusion axis, over an area of the skin portion; and determining whether or not that the distribution of material is arranged as an extrusion, by determining that the outer surface is an extrusion surface when the ratio is lower than a ratio threshold and that the outer surface is not the extrusion surface when the ratio is not lower than the ratio threshold, wherein the ratio is of a type:

$$R_N = \frac{\mu(\Omega)P_N}{\mathcal{A}_S},$$

with $\mathcal{A}_S$ the area of the skin portion, S the skin portion, and $\mathcal{A}_S=\int_S d\mathrm{vol}_S$ where $\mathrm{vol}_S$ is a canonical measure on S, with Ω a bounded 3D domain encompassing at least the skin portion and μ(Ω) an area of the bounded 3D domain Ω, and with $P_N$ an estimation of an expected value of a number of respective lines intersecting the skin portion.

12. The non-transitory computer readable data storage medium of claim 11, wherein the computing includes performing a Monte-Carlo method.

13. The non-transitory computer readable data storage medium of claim 12, wherein the Monte-Carlo method includes:

obtaining the bounded domain, sampling points of the bounded domain according to a probability distribution, for each sampled point, determining whether or not a respective line passing through the sample point and parallel to the extrusion axis, intersects the skin portion.

14. The non-transitory computer readable data storage medium of claim 13, wherein the estimation of the expected value of the number of respective lines intersecting the skin portion equals an average of values of an intersection function representing the intersection of a line with the skin portion, at each sampled point.

15. The non-transitory computer readable data storage medium of claim 13, wherein the method includes computing the orthogonal projection of the skin portion, wherein the bounded domain lies on the plane orthogonal to the extrusion axis and encompasses the orthogonal projection of the skin portion, and wherein for each sampled point, the determining includes determining whether or not the sampled point is inside the orthogonal projection of the skin portion on the bounded domain.

16. A system comprising:

a processor coupled to a memory, the memory having recorded thereon a computer program for material extrusion detection in a portion of a mechanical part having a distribution of material that when executed by the processor causes the processor to be configured to:

obtain a computer-aided design 3D model of the mechanical part, the computer-aided design 3D model being obtained from physical measurements on the mechanical part, the computer-aided design 3D model including a skin portion representing an outer surface of the portion of the mechanical part, obtain an extrusion axis, compute a ratio of an area of an orthogonal projection of the skin portion on a plane orthogonal to the extrusion axis, over an area of the skin portion, and determine whether or not the distribution of material is arranged as an extrusion, by determining that the outer surface is an extrusion surface when the ratio is lower than a ratio threshold and that the outer surface is not the extrusion surface when the ratio is not lower than the ratio threshold, wherein the ratio is of a type:

$$R_N = \frac{\mu(\Omega) P_N}{\mathcal{A}_S},$$

with $\mathcal{A}_S$ the area of the skin portion, S the skin portion, and $\mathcal{A}_S=\int_S d\mathrm{vol}_S$ where $\mathrm{vol}_S$ is a canonical measure on S, with Ω a bounded 3D domain encompassing at least the skin portion and μ(Ω) an area of the bounded 3D domain Ω, and with $P_N$ an estimation of an expected value of a number of respective lines intersecting the skin portion.

17. The system of claim 16, wherein the processor is configured to compute the ratio by being further configured to perform a Monte-Carlo method.

18. The system of claim 17, wherein the processor is configured to perform the Monte-Carlo method by being configured to:

obtain the bounded domain, sample points of the bounded domain according to a probability distribution, and for each sampled point, determine whether or not a respective line passing through the sample point and parallel to the extrusion axis, intersects the skin portion.

19. The system of claim 18, wherein the estimation of the expected value of the number of respective lines intersecting the skin portion equals an average of values of an intersection function representing the intersection of a line with the skin portion, at each sampled point.

20. The system of claim 18, wherein the processor is further configured to compute the orthogonal projection of the skin portion, wherein the bounded domain lies on the plane orthogonal to the extrusion axis and encompasses the orthogonal projection of the skin portion; and wherein for each sampled point, the processor is further configured to determine whether or not the respective line passing through the sample point and parallel to the extrusion axis, intersects the skin portion by being configured to determine whether or not the sampled point is inside the orthogonal projection of the skin portion on the bounded domain.

* * * * *